United States Patent Office 3,108,671
Patented Oct. 29, 1963

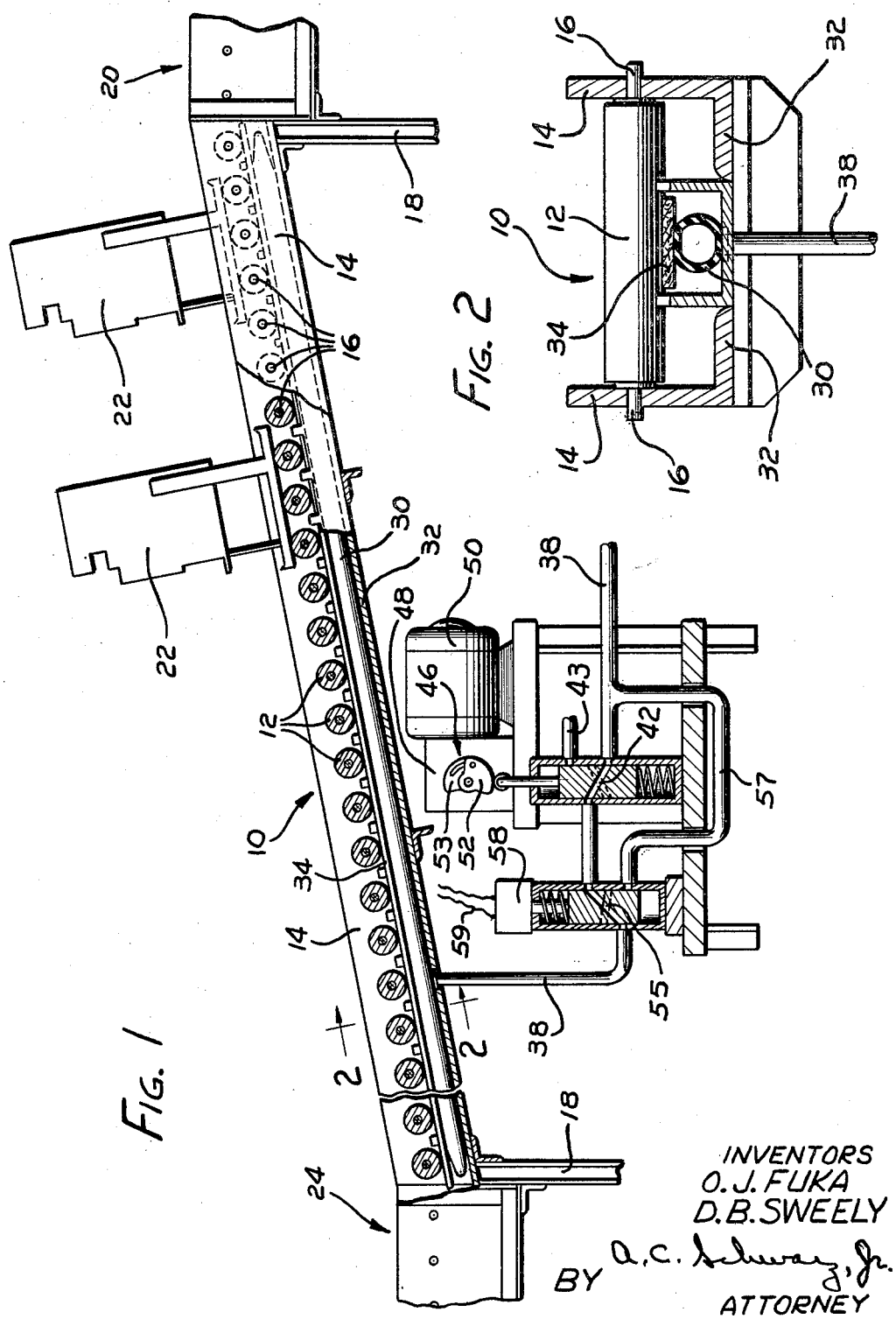

3,108,671
INCLINED ROLLER CONVEYOR FOR CONVEYING ARTICLES AND CONTROLLING THE RATE OF MOVEMENT THEREOF
Otto J. Fuka, Berwyn, and Donald B. Sweely, Naperville, Ill., assignors to Western Electric Company, Incorporated, New York, N.Y., a corporation of New York
Filed Aug. 25, 1960, Ser. No. 51,871
6 Claims. (Cl. 193—35)

This invention relates to inclined gravity type roller conveyors for conveying articles, and more particularly to inclined gravity type roller conveyors for conveying articles and controlling the rate of movement thereof.

Articles conveyed on inclined gravity type roller conveyors over a substantial distance and slope accelerate as they advance along the conveyor and may attain a substantial velocity at the end of their traverse. The high velocity of articles being thus conveyed is objectionable in that it presents various problems such as the stopping of the articles, the damaging of the articles by impact with one another, and the tipping of articles, especially if they are tall in proportion to their base.

An object of the present invention is to provide an improved inclined roller conveyor for conveying articles and controlling the rate of movement thereof.

Another object of the invention is to provide a gravity type of roller conveyor having mechanism for controlling the rotation of the rollers and providing uniform rates of travel of articles thereon.

With these and other objects in view, the invention contemplates the provision of a gravity type conveyor having an inclined row of rollers rotatably supported on a frame for conveying articles thereon. Rotation of the rollers is controlled by an elongated inflatable tube which is suitably supported below and longitudinally of the row of rollers and is inflated by compressed air under control of a valve. Adjustable means is provided for actuating the valve to cause the inflation and deflation of the tube for predetermined intervals to effect the alternate braking and release of the rollers for predetermined adjustable intervals of time to control the rate of movement of the articles on the conveyor. An elongated brake shoe in the form of a flexible belt may be interposed between the rollers and the tube to prevent wear of the latter.

Other objects, advantages and novel aspects of the invention will become apparent upon consideration of the following detailed description, in conjunction with the accompanying drawings, wherein:

FIG. 1 is a vertical longitudinal sectional view of the conveyor; and

FIG. 2 is a cross section of the conveyor taken on line 2—2 of FIG. 1.

Referring to the drawings, a conveyor 10 comprises an inclined row of rollers 12 supported on a pair of elongated inclined side frames 14 in parallel and closely spaced relation to one another for rotation about their axis. As shown herein the rollers 12 are fixed to shafts 16, the ends of which are journalled in the side frames 14. The conveyor 10 is supported at intervals on a suitable frame member 18. One end of the conveyor is positioned at a receiving station 20 for receiving articles 22 that are to be conveyed to a delivery station 24 where the articles are deposited onto a work bench or other suitable receiving surface.

Provision is made for controlling the rate of movement of the articles 22 on the conveyor 10 to prevent the acceleration of the articles thereon and prevent the attainment of an undesirably high velocity as the articles arrive at the delivery end of the conveyor. Such means comprises an inflatable tube 30 of pliable plastic material which is closed at opposite ends and is supported under and along the full length of the row of rollers 12 in a channel-shaped member 32. The member 32 extends throughout the length of the conveyor 10 and is suitably supported by the side frames 14.

The tube 30 is adapted to be inflated by compressed air to cause the upper walls thereof to engage the bottom portions of the rollers and arrest the rotation thereof, and the tube is adapted to be deflated to release the rollers and permit rotation thereof. Preferably, an elongated brake shoe 34 in the form of a flexible belt is supported on the tube 30 for movement therewith into and out of engagement with the rollers 12 to prevent unnecessary wear of the tube 30. The brake shoe 34 is suitably held against longitudinal displacement.

Intermediate its ends the tube 30 is connected to a supply line 38 of compressed air which flows into and out of the tube 30 under control of a valve 42 to effect the inflation and deflation of the tube 30. The valve 42 is of a conventional type operable in one position to admit the flow of compressed air into the tube 30 to inflat the tube and arrest the rotation of the rollers 12, and operable in a second position to shut off the supply of compressed air to the tube 30 and exhaust the air therefrom through a tube 43 and thereby effect the deflation of the tube 30 and release of the rollers 12. The valve 42 is spring urged in one direction to a normal closed position and is moved to an open position by a cam 46 which is continuously rotated by a drive including a gear reducer 48 and a motor 50.

The invention provides for varying the rate of movement of the articles 22 on the conveyor 10 by adjusting the relative length of time between the intervals during which the rollers 12 are engaged with and disengaged from the brake 34. For this purpose the cam 46 is provided with a pair of cam lobes 52, 53, the latter of which is movable and may be adjusted relative to the fixed lobe and locked in adjusted position by suitable means. Thus, the length of the low and the high surfaces of the cam are readily adjusted relative to each other to control the length of time that the valve is in its normal closed position relative to the length of time that the valve is in its open position.

A safety provision is also included for applying the brake to the rollers 12 in the event of power failure which might stop the cam shifting mechanism in a position with the brake 34 disengaged from the rollers 12. Such is accomplished by including a valve 55 connected to the supply line 38 between the tube 30 and the control valve 42 and in series therewith, and connected by a by-pass conduit 57 to the supply line 38 around the control valve 42. The valve 55 is moved to one position by a solenoid 58 which is connected to a power line 59 and is normally maintained in that position while the power is on to establish a connection to the supply line 38 through the control valve 42 as shown in FIG. 1. When the solenoid 58 is deenergized for any reason, such as failure of the power line 59, and thus of the motor 50, the valve 55 is spring shifted to a second position in which it establishes a connection between the tube 30 and the air supply line 38 through the by-pass conduit 57 and around the control valve 42, thereby effecting the inflation of the tube 30 and the braking of the rollers 12.

When the articles 22 are placed on the upper receiving end of the conveyor 10 they move along the conveyor intermittently through predetermined distances when the rollers 12 are free to rotate, and the articles are stopped when the rollers are held against rotation by the brake 34 in response to inflation of the tube 30. The frequency of the intermittent advancing movements of the articles 22 may be varied in accordance with the slope and other features of design of the conveyor by adjusting the rate of rotation of the cam 46. The average rate of feeding movement of the articles 22 on the conveyor may be varied by adjusting the period of time during which they are advancing relative to the time during which they are held against movement. This is accomplished as pointed out hereinbefore by adjusting the position of the movable cam lobe 53 relative to the stationary cam lobe 52 to vary the length of time that the tube 30 is deflated relative to the length of time that it is inflated during each cycle of rotation of the cam 46.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A conveyor comprising a plurality of rollers, frame means for supporting the rollers for rotation about their axis and in an obliquely disposed row for conveying articles by gravity, a member supported on said frame means beneath said row of rollers and parallel thereto, an inflatable tube supported on said member and operable when inflated to arrest the rotation of said rollers, means including a valve for connecting said tube to a source of compressed air, a rotary cam for actuating said valve to effect predetermined intervals of inflation and deflation for each revolution of said cam, and means including a motor for rotating said cam.

2. A gravity type conveyor comprising a plurality of rollers, frame means for supporting the rollers for rotation about their axis and in an obliquely disposed row, a member supported on said frame means beneath said row of rollers and parallel thereto, an inflatable tube supported on said member, a brake shoe supported on said inflatable tube and engageable with said rollers when said tube is inflated for arresting the rotation of said rollers, means connecting said tube to a source of compressed air, valve means in said connecting means for controlling the flow of air into and out of said tube, a rotary cam having adjustable lobes for actuating said valve means to effect the inflation and deflation respectively of said tube for relatively adjustable intervals, and drive means for rotating said cam.

3. A gravity type conveyor for advancing articles comprising, a plurality of laterally spaced rollers mounted for rotation about their axes and in an obliquely disposed row, an inflatable tube for stopping the rotation of the rollers when inflated and for releasing the rollers when deflated, means for supporting said tube beneath said row of rollers in parallel relation thereto, means for cyclically inflating and deflating said tube to effect the alternate stopping and release of the rollers for predetermined intervals of time during each cycle to control the rate of movement of the articles thereon, and means associated with the last-named means for adjusting the time interval of the stopping of the rollers relative to the time interval of the release of the rollers for each cycle to vary the rate of movement of the articles.

4. A conveyor comprising a plurality of rollers, frame means for supporting the rollers for rotation about their axes and in laterally spaced relation to each other in an obliquely disposed row for conveying articles by gravity, a member supported on said frame means beneath said row of rollers and parallel thereto, an inflatable tube supported on said member and operable when inflated to engage and arrest the rotation of said rollers and when deflated to release said rollers, means including a valve for connecting said tube to a source of compressed air, a rotary cam for actuating said valve to effect predetermined intervals of inflation and deflation for each rotation of said cam, means including a motor connected to a source of electrical power for rotating said cam, and means including an electrically operated valve connected to said electrical source of power for connecting said tube to the source of compressed air to effect the inflation of said tube in the event of failure of said electrical power.

5. A gravity type conveyor comprising a plurality of rollers, frame means for supporting the rollers for rotation about their axes in an obliquely disposed row for conveying articles, a member supported on said frame means beneath said row of rollers and parallel thereto, an inflatable tube supported on said member, a flexible brake shoe on said inflatable tube engageable with the rollers for arresting the rotation thereof when said tube is inflated and for releasing the rollers when said tube is deflated, means including a valve for connecting said tube to a source of compressed air, a rotary cam for actuating said valve to effect a predetermined interval of inflation and an interval of deflation for each rotation of said cam, and means including a motor for rotating said cam.

6. A gravity type conveyor for articles comprising, a channel shaped frame mounted on an incline and having upwardly extending side walls and a bottom wall, a plurality of laterally spaced rollers mounted in the side walls to span the bottom wall, an inflatable tube axially extending through said channel, an elongated flexible belt interposed between said tube and the undersides of said rollers, said tube having a dimension inflatable to a distance greater than the linear dimension between the bottom wall and the underside of the belt when the upper side of the belt engages the undersurfaces of the rollers, and means for inflating said tube to move the outer surface thereof and the flexible belt into braking engagement with the undersurfaces of said rollers.

References Cited in the file of this patent
UNITED STATES PATENTS

| 1,924,899 | Anderson | Aug. 29, 1933 |
| 2,979,177 | Sullivan | Apr. 11, 1961 |

FOREIGN PATENTS

| 1,057,973 | Germany | May 21, 1959 |